(12) United States Patent
Crockett et al.

(10) Patent No.: US 7,903,805 B2
(45) Date of Patent: Mar. 8, 2011

(54) METHOD AND SYSTEM FOR PROVIDING ENHANCED CALL WAITING

(75) Inventors: Susanne Marie Crockett, Buffalo Grove, IL (US); Karen Jeanne Pelletier, Crystal Lake, IL (US); Tricia Ehlers Henry, Barrington, IL (US); Roberto Carrion, Barrington, IL (US); Mary Louis Hardzinski, Palatine, IL (US); Thomas Joseph McBlain, Arlington Heights, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 222 days.

(21) Appl. No.: 11/429,739

(22) Filed: May 8, 2006

(65) Prior Publication Data

US 2006/0233323 A1      Oct. 19, 2006

Related U.S. Application Data

(63) Continuation of application No. 10/350,918, filed on Jan. 24, 2003, now Pat. No. 7,095,826, which is a continuation of application No. 09/439,902, filed on Nov. 12, 1999, now Pat. No. 6,539,079.

(51) Int. Cl.
*H04M 3/42* (2006.01)
(52) U.S. Cl. .................. 379/215.01; 379/87; 379/208.01
(58) Field of Classification Search .................... 379/70, 379/88.23, 207.08, 215.01, 208.01, 87
See application file for complete search history.

(56) References Cited

U.S. PATENT DOCUMENTS

| | | | |
|---|---|---|---|
| 3,956,595 A | | 5/1976 | Sobanski |
| 4,166,929 A | | 9/1979 | Sheinbein |
| 4,567,323 A | | 1/1986 | Lottes et al. |
| 4,873,713 A | | 10/1989 | Yamanouchi et al. |
| 4,899,374 A | | 2/1990 | Van Landeghem |
| 4,947,421 A | | 8/1990 | Toy et al. |
| 4,972,461 A | | 11/1990 | Brown et al. |
| 5,007,076 A | | 4/1991 | Blakely |
| 5,268,957 A | | 12/1993 | Albrecht |
| 5,313,516 A | | 5/1994 | Afshar et al. |
| 5,394,445 A | * | 2/1995 | Ball et al. ................... 379/88.21 |
| 5,406,616 A | | 4/1995 | Bjorndahl |
| 5,425,091 A | | 6/1995 | Josephs |
| 5,471,519 A | | 11/1995 | Howe et al. |
| 5,502,761 A | | 3/1996 | Duncan et al. |
| 5,533,100 A | | 7/1996 | Bass et al. |
| 5,568,539 A | | 10/1996 | Bergsman et al. |
| 5,604,792 A | * | 2/1997 | Solomon et al. ........... 379/88.23 |
| 5,652,789 A | | 7/1997 | Miner et al. |
| 5,752,191 A | | 5/1998 | Fuller et al. |
| 5,768,348 A | * | 6/1998 | Solomon et al. ............. 379/67.1 |
| 5,768,359 A | | 6/1998 | DiPierro, Jr. et al. |
| 5,857,013 A | * | 1/1999 | Yue et al. ..................... 379/88.2 |
| 5,894,504 A | * | 4/1999 | Alfred et al. ............... 379/88.13 |
| 5,937,050 A | * | 8/1999 | Yue et al. ................. 379/100.06 |
| 5,946,386 A | | 8/1999 | Rogers et al. |
| 6,028,921 A | | 2/2000 | Malik et al. |
| 6,122,347 A | * | 9/2000 | Borland ......................... 379/70 |

(Continued)

*Primary Examiner* — Simon Sing
*Assistant Examiner* — Simon King
(74) *Attorney, Agent, or Firm* — Cantor Colburn LLP

(57) ABSTRACT

A method and system are disclosed for providing an enhanced call waiting announcement to a called party that is busy on a first call and receives a second call. Information provided by a second calling party is recorded and played back to the called party after the first call is over. The called party is not interrupted during the duration of the first call.

24 Claims, 6 Drawing Sheets

U.S. PATENT DOCUMENTS

| | | | |
|---|---|---|---|
| 6,259,772 B1 * | 7/2001 | Stephens et al. | 379/88.23 |
| 6,285,745 B1 | 9/2001 | Bartholomew et al. | |
| 6,292,799 B1 * | 9/2001 | Peek et al. | 707/10 |
| 6,343,121 B1 * | 1/2002 | Infosino | 379/215.01 |
| 6,456,709 B1 | 9/2002 | Cox et al. | |
| 6,546,084 B1 * | 4/2003 | Castagna | 379/88.12 |
| 6,804,332 B1 * | 10/2004 | Miner et al. | 379/88.13 |
| 6,816,493 B2 * | 11/2004 | Shi et al. | 370/395.4 |
| 7,023,968 B1 * | 4/2006 | Silvester | 379/88.13 |
| 7,212,617 B2 * | 5/2007 | Owens et al. | 379/93.24 |
| 7,515,695 B1 * | 4/2009 | Chan et al. | 379/88.18 |
| 2009/0109959 A1 * | 4/2009 | Elliott et al. | 370/352 |

* cited by examiner

METHOD AND SYSTEM FOR PROVIDING ENHANCED CALL WAITING

RELATED APPLICATIONS

The present application is a continuation of U.S. patent application Ser. No. 10/350,918, filed Jan. 24, 2003 now U.S. Pat. No. 7,095,826, which is a continuation of U.S. patent application Ser. No. 09/439,902 (now U.S. Pat. No. 6,539,079), filed Nov. 12, 1999, the entirety of which are both hereby incorporated herein by reference.

BACKGROUND

The present invention relates generally to telecommunications call processing and more particularly to call waiting service features.

Call waiting services are offered by numerous telephone service providers and are well known by those skilled in the art. Call waiting services generally notify a customer who is engaged in a first call that a second call has been placed to them. Some call waiting services utilize an audible tone that is transmitted to the customer during the first call, to notify the customer that the second call is waiting. Other call waiting services substitute the name of the calling party in place of the tone commonly used to notify the customer. In both systems, the notification of the second call is sent to the customer while they are still engaged in the first call. This notification can be distracting to both of the parties engaged in the first call. In addition, these systems typically allow the customer to answer the second call by placing the first call on hold. This causes an interruption of the first call and can also be distracting to both parties engaged in the first call.

U.S. Pat. No. 5,768,359 describes an alternative system to these traditional call waiting systems. In this system, the notification of the second call is sent to the customer after the first call is over, but the notification is not effective. When the system receives the second call, it stores the telephone number from which the second call was placed. After the first call is over, the system calls the customer and provides him with the stored telephone number. However, because the system only provides the telephone number from which the second call was placed it does not effectively identify the calling party. This system is particularly ineffective when the second call is placed from a telephone that is not associated with the second caller, such as a pay phone, a restaurant's phone, a business's phone, or another person's phone. Therefore, a system that overcomes these deficiencies is needed.

DETAILED DESCRIPTION OF THE DRAWINGS

Figure 1:
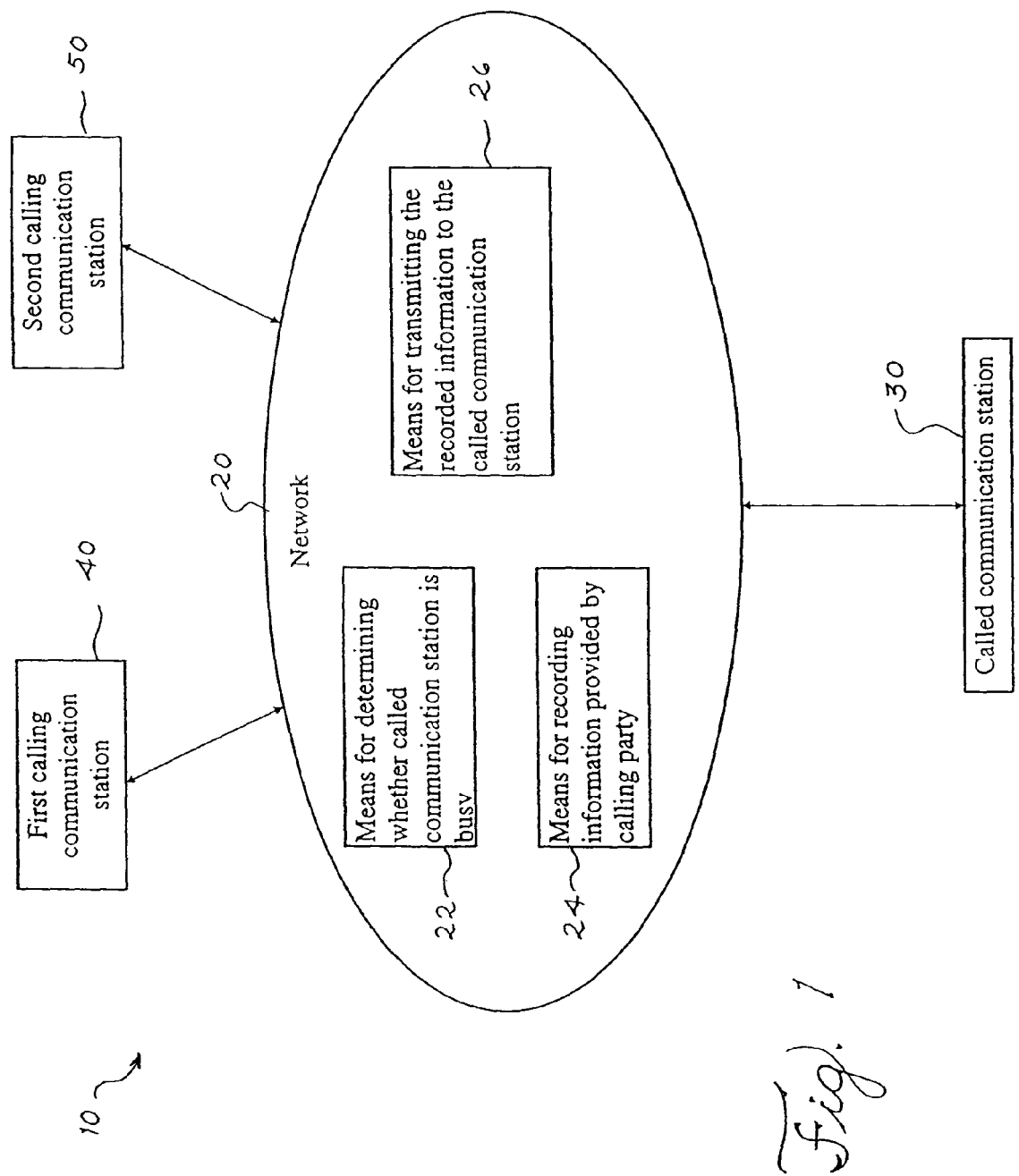
FIG. 1 is a block diagram of a system for processing a telephone call of a preferred embodiment.

By way of example, FIG. 1 depicts a system 10 of a preferred embodiment. The system 10 comprises a network 20 that can be coupled with a called communication station 30, a first calling communication station 40, and a second calling communication station 50. The phrase "coupled with," as used herein, means coupled either directly or indirectly via one or more intervening elements. The network 20 preferably comprises means for determining whether the called communication station is busy 22, means for recording information provided by a calling party at the second calling communication station 24, and means for transmitting the recorded information to the called communication station 26.

The system 10 is preferably implemented in a telecommunications network. Alternatively, the system 10 can be implemented in computer network or any other network that is adapted to store and retrieve information. Each of the means 22, 24, 26 described above is preferably implemented through the use of computer readable program code written in any suitable programming language and implemented on an analog or digital computer utilizing any suitable operating system. Alternatively, each of the means 22, 24, 26 can be implemented through the use of hardware in the form of a hardwired computer, an integrated circuit, or a combination of hardware and computer readable program. The called communication station 30, first calling communication station 40, and second calling communication station 50 preferably comprise an analog telephone. Alternatively, the communication stations 30, 40, 50 can comprise any suitable communication station, including wireless, PCN, ISDN, or any other form of communication station adapted for use in the present embodiments.

The system 10 enables a called party at the called communication station 30, who is busy on a first call from the first calling communication station 40, to be effectively notified that a second call from the second calling communication station 50 was placed to him without interrupting the first call. After receiving the second call from the second calling communication station 50, the network 20 can determine that the called communication station 30 is engaged in a first telephone call with a first calling party at the first calling communication station 40. The network 20 can then record information that is provided by a calling party at the second calling communication station 50. The information recorded is preferably limited to 15 seconds or less of information but can be any duration of information. If the information is less than 15 seconds, the system differs from traditional voice mail systems, which typically do not limit their messages to 15 seconds. The second calling party can record their name and telephone number, which unlike prior systems that only provide a telephone number, effectively identifies the second calling party. The network 20 can then automatically transmit the recorded information to the called party at the called communication station 30 after the first call is over. The called party is thereby notified that the second call was placed without being interrupted during the first call because neither a call waiting indicator nor other information is transmitted to the called party during the first call.

Figure 2:
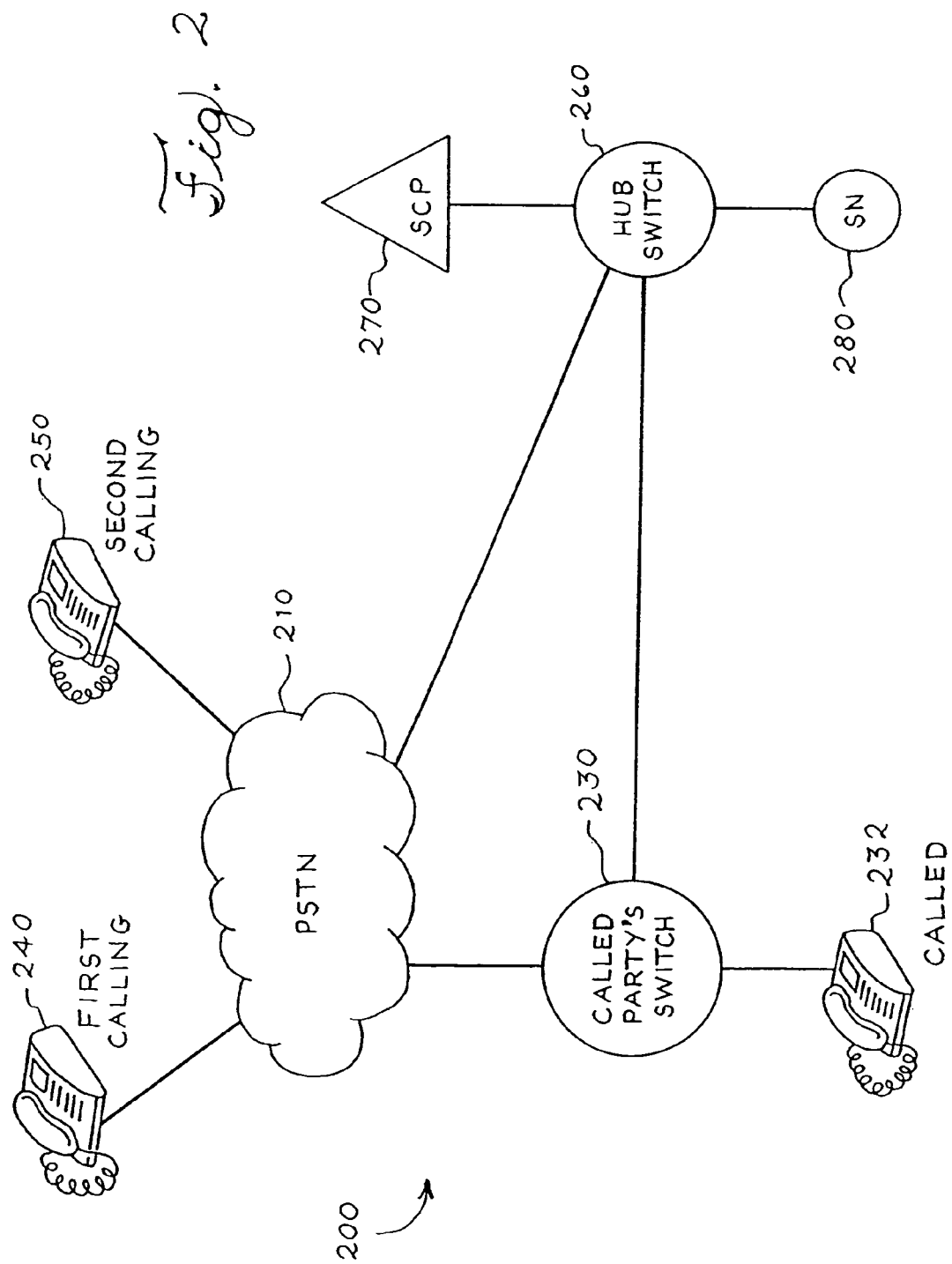
FIG. 2 is more detailed block diagram of the system depicted in FIG. 1.

By way of further example, FIG. 2 depicts a preferred embodiment of the system described above. The system 200 comprises a publicly switched telephone network (PSTN) 210, a called party's switch 230, a called telephone station 232, a first calling telephone station 240, a second calling telephone station 250, a hub switch 260, a service control point (SCP) 270, and a service node (SN) 280. This system can be implemented with intelligent network components, commonly referred to as advanced intelligent network (AIN) components, which can implement computer readable program code, and are commercially available from Lucent Technologies. Vendors of AIN components typically have a preferred programming language and operating platform as known by those skilled in the art. Alternatively, this system can be implemented using a Unix platform, an NT server, or other suitable computer systems.

PSTN 210 preferably comprises a group of interconnected network components including signal transfer points, central office switches, tandem switches, and other such switches, along with other network components that route telephone calls as known by those skilled in the art. The PSTN can also include SCPs and SNs. The network components preferably transmit information in accordance with a signaling protocol such as Signaling System 7 (SS7), internet protocols, or other such protocols as known by those skilled in the art. The PSTN 210 is preferably coupled with the calling telephone stations 240, 250 and the called party's switch 230 and enables calls to be placed between the calling telephone stations 240, 250 and the called telephone station 232.

The called party's switch 230 can comprise an AIN switch, such as a service switching point (SSP), or a non-AIN switch, such as a central office switch. The called party's switch 230 is preferably coupled with the PSTN 210 and the hub switch 260. In a preferred embodiment, the called party's switch 230 is preferably connected to one or more telephone stations, such as the called telephone station 232 and is not directly connected to the SCP 270 or SN 280, which are preferably connected to the hub switch 260 as described herein. The called party's switch 230 connects called telephone station 232 with the PSTN 210 to enable a customer at called telephone station 232 to place calls to and receive calls from telephone stations 240, 250. The called party's switch 230 is preferably coupled with the hub switch 260 by a direct trunk and preferably communicates with hub switch 260 in accordance with a signaling protocol such as Signaling System 7 (SS7), internet protocols, or other such protocols. The called party's switch 230 can alternatively be coupled with the hub switch 260 through the PSTN 210.

The telephone stations 232, 240, 250 preferably comprise analog telephone sets. Alternatively, the telephone stations 232, 240, 250 can comprise wireless, PCN, ISDN or any other form of communication station.

The hub switch 260 can comprise an AIN switch, such as an SSP, or a non-AIN switch, such as a central office switch, as described herein. The hub switch 260 can be coupled with the called party's switch 230, the SCP 270, and the SN 280. In a preferred embodiment, the hub switch 260 is preferably connected to the SCP 270 and the SN 280, while the called party's switch 230 is not directly connected to the SCP 270 or the SN 280. In this way, the hub switch 260 serves as a centralized location for the SCP 270 and the SN 280.

The SCP 270 preferably comprises an AIN element that can receive queries from the hub switch 260 and can analyze information included within the queries. The SCP 270 can also store call control information and accesses the stored call control information. The SCP 270 is preferably coupled with the hub switch 260 and can communicate with the hub switch 260 via a signaling protocol such as SS7, internet protocols, or the like. Alternatively a suitable processor can be used in place of the SCP 270.

The SN 280 preferably comprises a network element that stores call control information and performs call related functions as known by those skilled in the art. The SN 280 can generate announcements that can be transmitted to the PSTN 210 and to the calling telephone stations 240, 250 and/or the called telephone station 232. The SN 280 can also record information transmitted from the calling telephone stations 240, 250 and can transmit the recorded information to the called telephone station 232. The SN 280 can also include logic that can analyze information in the same manner as an SCP. Alternatively a processor in a Unix platform, an NT server, or other suitable computer system can be used in place of the SN 280.

In an alternative embodiment, an intelligent peripheral (IP) can be used in place of the SN 280. The IP preferably comprises an AIN element that performs the same functions as the SN 280 described herein.

Figure 3:
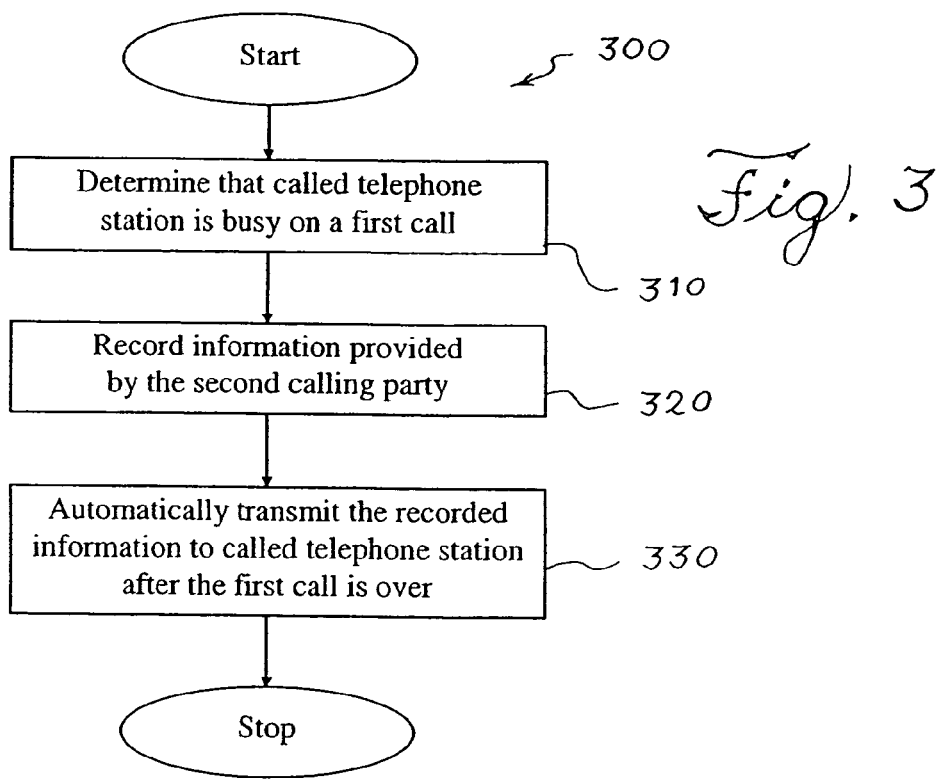
FIG. 3 is a flow chart of a method for processing a telephone call of a preferred embodiment.

The system depicted in FIG. 2 can be utilized to implement the method 300 depicted in FIG. 3. For purposes of illustration, assume that a called party at the called telephone station 232 (FIG. 2) is engaged in a first call with a first calling party at the first calling telephone station 240. Also, assume that during the first call, a second calling party at the second calling telephone station 250 places a second call to the called party, and the second call is routed through the PSTN 210 to the called party's switch 230.

The method 300 of processing the second call from the second calling telephone station 250 to the called telephone station 232 generally comprises the acts of: determining whether the called telephone station 232 is busy on a first call (act 310, FIG. 3); recording information that is provided by the second calling party (act 320); and automatically transmitting the recorded information to the called telephone station 232 after the first call is over (act 350). Each of these acts is discussed in more detail below.

Figure 4:
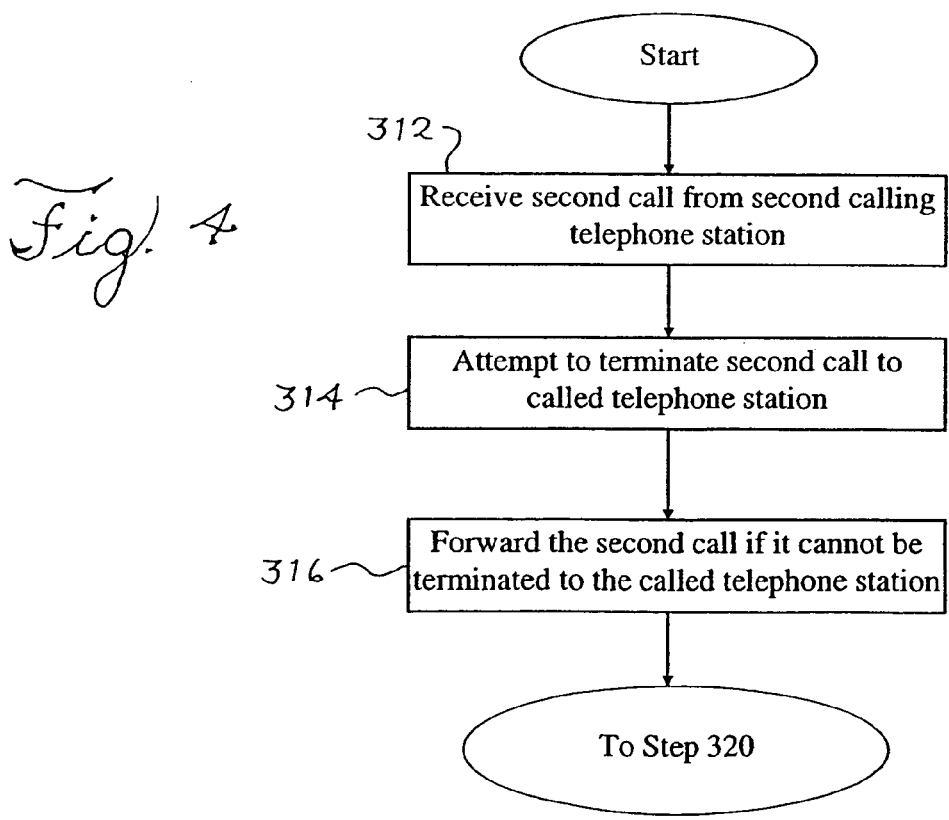
FIG. 4 is a more detailed flow chart of the method depicted in FIG. 3.

The act of determining whether the called telephone station 232 is busy on a first call (act 310, FIG. 3) preferably comprises the following acts as depicted in FIG. 4. The called party's switch 230 can receive the second call (act 312, FIG. 4) and can attempt to terminate the second call to the called telephone station 232 (act 314). However, because the called party at the called telephone station 232 is busy on the first call, the second call cannot be terminated to called telephone station 232 and the called party's switch 230 can forward the second call for further processing (act 316). The second call can be forwarded, for example, in accordance with a preexisting feature of the called party's switch 230 such as call forward on busy. Alternatively, the second call can be forwarded through the use of a trigger that can be generated by the called party's switch 230. For example, the called party's switch 230 can be configured to include a trigger, such as a terminating busy trigger, terminating attempt trigger, that automatically causes the second call to be transferred. In another example, the called party's switch 230 can be configured to include a trigger that results in a query being generated that seeks routing information that can be used to forward the second call.

Figure 5:
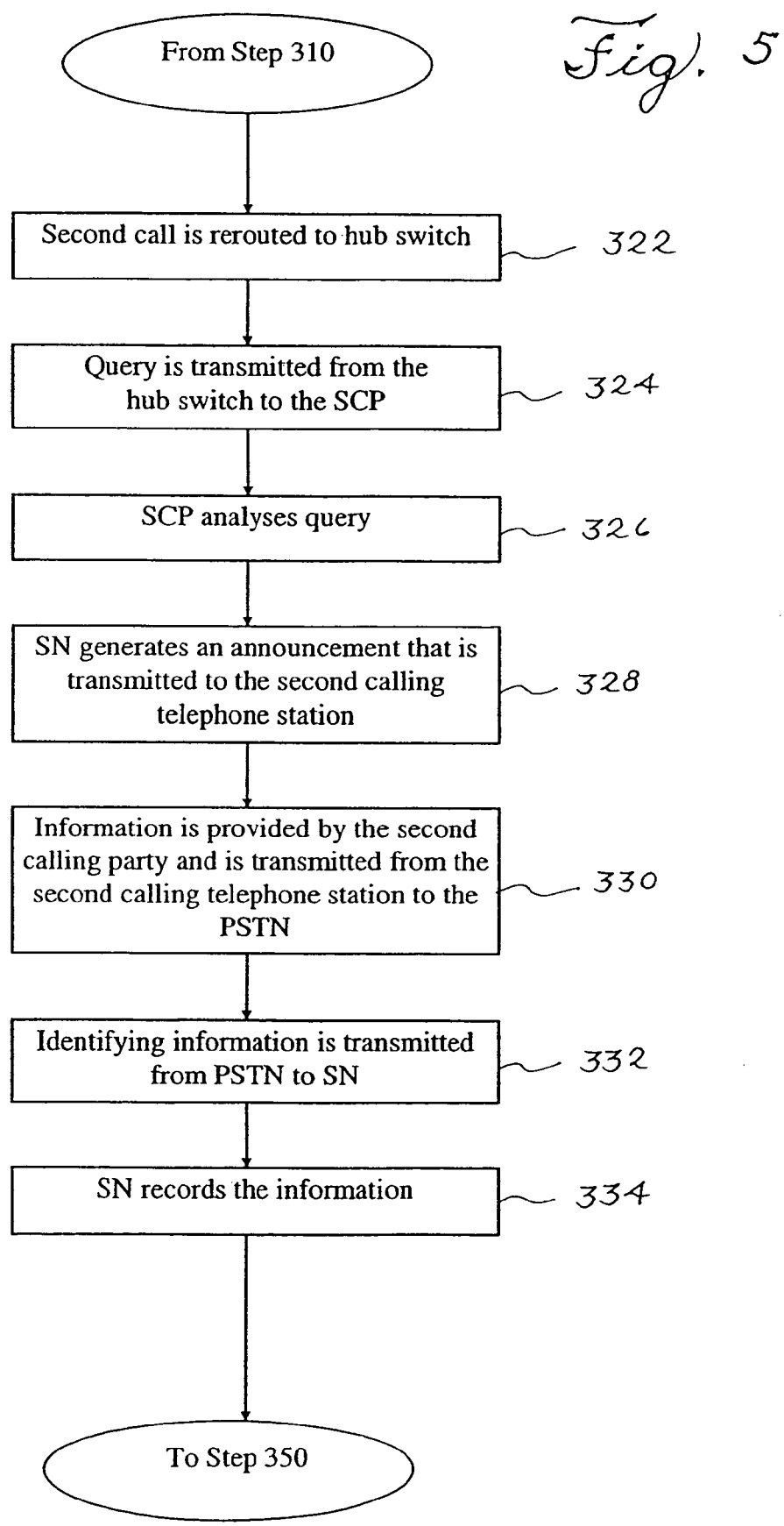
FIG. 5 is a more detailed flow chart of the method depicted in FIG. 3.

The act of recording information provided by a second calling party (act 320, FIG. 3) preferably-comprises the following acts as depicted in FIG. 5. After the called party's switch 230 has determined that the called party at the called telephone station 232 is busy on the first call, the second call can be forwarded to the SN 280 as described above. To forward the second call to the SN 280, the called party's switch 230 preferably reroutes the second call to the hub switch 260 (act 322). The called party's switch 230 can reroute the second call to the hub switch 260 by routing the second call to a certain telephone number, which essentially connects the second calling telephone station 250 with the hub switch 260 and the SN 280. When the second call is forwarded to the hub switch 260, a query can be transmitted from the hub switch 260 to the SCP 270 (act 324). The query can be an AIN or an non-AIN query. The query preferably contains the ten digit telephone number associated with the second calling telephone station 250 and requests the SCP 270 to analyze the telephone number included within the query.

After receiving the query, the SCP 270 can analyze the information included in the query to determine whether the call originated from the SN 280 (act 326). If the call originated from the SN 280, then it can be determined that this call was placed to the called telephone station 232 in an attempt to deliver information recorded by the SN 280. In such a case, this call can be ignored, and the SN 280 can be reset to again attempt to deliver the recorded information to the called telephone station 232. This analysis prevents the system from entering a loop by attempting to record information for a call that originated from the SN 280 and for which there is no calling party.

If it is determined that the call did not originate from the SN 280, an announcement is then transmitted from the SN 280 to the second calling telephone station 250 (act 328). The announcement requests that the second calling party provide audible information by, for example, saying their name and telephone number. The announcement can state that the person the second calling party is calling is currently on the phone and can request that they briefly state they name and telephone number. Alternatively, the announcement can request that the second calling party say only their name or provide other types of information or instructions. In addition to providing audible information, the second calling party can provide textual information by entering keys on their telephone or the like. This can be done in place of or in addition to the audible information. The announcement can also indicate that the second calling party can seek assistance by providing DTMF or voice input.

The information provided by the second calling party can be transmitted from the second calling telephone station 250 to the PSTN 210 (act 330). The information can be transmitted from the PSTN 210 to the SN 280 (act 332). The SN 280 can analyze the information to ensure that information was received and can digitize and record this information (act 334). Alternatively, if the information is in a text format, the information can recorded and then converted from a text format to an audible format through the use of a text to speech module that can be included within or coupled with the SN 280. If no information is received by the SN 280, another announcement requesting such information can be sent to the second calling party or the announcement can instruct the second calling party to call back at a later time.

In a further alternative embodiment, in addition to transmitting a request for information to the second calling telephone station 250 (act 332, FIG. 5) a request for control commands can also be transmitted to the second calling telephone station 250. For example, a request for control commands relating to the handling of and/or the content of the information can be transmitted from the SN 280 the second calling telephone station 250. Control commands provided by the second calling party at the second calling telephone station 250 can, among other things, be used to determine and assign a priority to the recorded information.

For example, if the second calling party believes that the recorded information is of an urgent nature, the second calling party may transmit appropriate control commands that enable the SN 280 provide the recorded information, which the second calling party provided, to the called telephone station 232 before providing other recorded information provided by other calling parties. The second calling party can, for example, utilize dual-tone-multi-frequency (DTMF) signals to provide the control commands. Alternatively, the second calling party can provide audible control commands that can be interpreted by voice recognition capabilities that can be included within or coupled with the SN 280.

Figure 6:
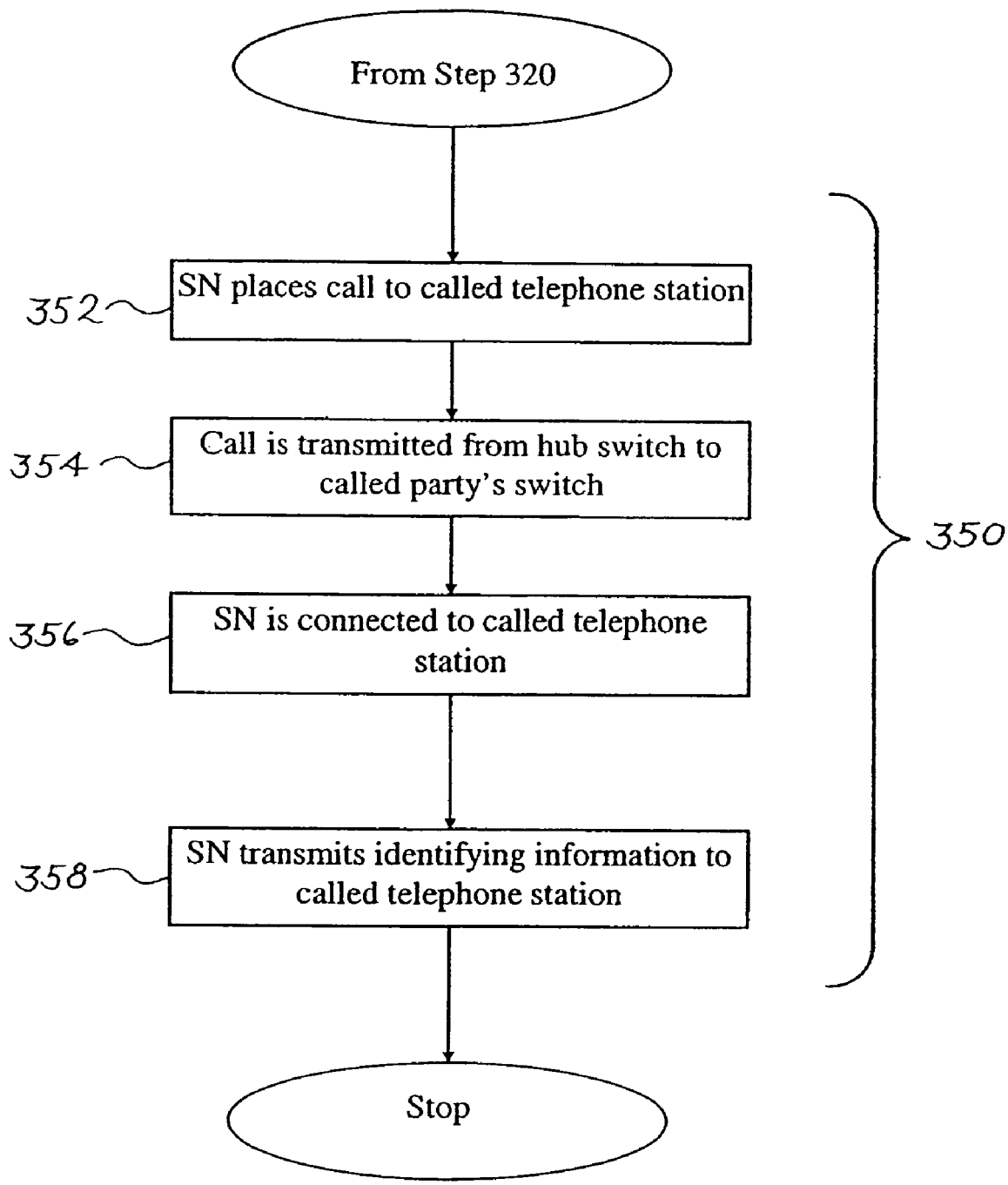
FIG. 6 is a more detailed flow chart of the method depicted in FIG. 3.

The act of automatically transmitting the recorded information to the called telephone station 232 after the first call is over (act 350, FIG. 3), preferably comprises the following acts. After the information has been recorded, the SN 280 can determine that the first call is over by periodically placing an outgoing call to the telephone number of the called telephone station 232 (act 352, FIG. 6). The outgoing call can be transmitted from the hub switch 260 to the called party's switch 230 (act 354). If the outgoing call is answered at the called telephone station 232, it can be determined that the first call is over and SN 280 is coupled with the called telephone station 232 (act 356). The recorded information can then be transmitted to the called telephone station 232. (act 358). The recorded information can be transmitted to the called telephone station 232 after an informational announcement is first transmitted to the called telephone station 232. For example, an announcement indicating the number of calls and the time and date of each call can be transmitted along with the identifying information.

The SN 280 preferably places the outgoing call to the called telephone station 232 at one minute intervals for the first thirty minutes after the information has been recorded. During the next one and one-half hours, the SN 280 preferably places the outgoing call to the called telephone station 232 once every five minutes. Thereafter, the SN 280 preferably places the outgoing call to the called telephone station once every fifteen minutes. The SN 280 can continue to place the calls indefinitely, or the SN 280 can stop placing the calls after a predetermined amount of time has passed. Other variations in the timing of the calls from the SN 280 are possible.

In an alternative embodiment, the SCP 270 can monitor status of the called telephone station 232 to determine when the first call is over. The SCP 270 can monitor the status of the called telephone station's line and can determine when a change in the status of the line occurs. Such a change in status signifies that the called party has finished the first call and has hung up the telephone. When the first call is over, the SN 280 can place the outgoing call to the called telephone station 232.

In a further alternative embodiment, in addition to transmitting the recorded information to the called telephone station 232 (act 350, FIG. 3), the SN 280 can transmit an announcement that provides the called party with options for processing or responding to the recorded information. The announcement preferably comprises audible instructions that are transmitted by the SN 280 to the called telephone station 232. For example, the announcement can indicate that the called party can delete the recorded information, save the recorded information, or call back the party that recorded the information. The called party can respond to such an announcement by transmitting DTMF tones or by speaking instructions that can be received by the SN 280. In this embodiment, the recorded information is preferably transmitted three times in succession if no response is received from the called party so that an answering machine or a voice mail can record information.

In a further alternative embodiment, the second calling party can enter a password or similar command to override the system and immediately identify the existence of the second call without having to record information. This can enable the second calling party to, among other things, speak with the called party at the called telephone station 232. The second calling party can place a call to the called telephone station 232. If called party is engaged in a first telephone call, the second calling party will be instructed to record information as described herein. Rather than providing the information, the second calling party can transmit a password or other suitable command to override the present system and enable the second call to ring through to the called party as normally occurs with call waiting. The password can be entered through the use of DTMF tones, voice, or any other suitable manner. The SN 280 can receive the password and compare it to data stored within SN 280. The stored data can comprise passwords or other identification data and can be stored in a reference table. If the received password matches the stored password, the SN 280 can enable the second call to ring through to the called telephone station 232 or can allow the call to be immediately connected to called telephone station 232.

In a further alternative embodiment, a distinctive ring can be used when transmitting the recorded information to the called telephone station 232 (act 350, FIG. 3). The distinctive ring can be used to distinguish a call that is providing the recorded information from a normal call from a calling party.

Figure 7:
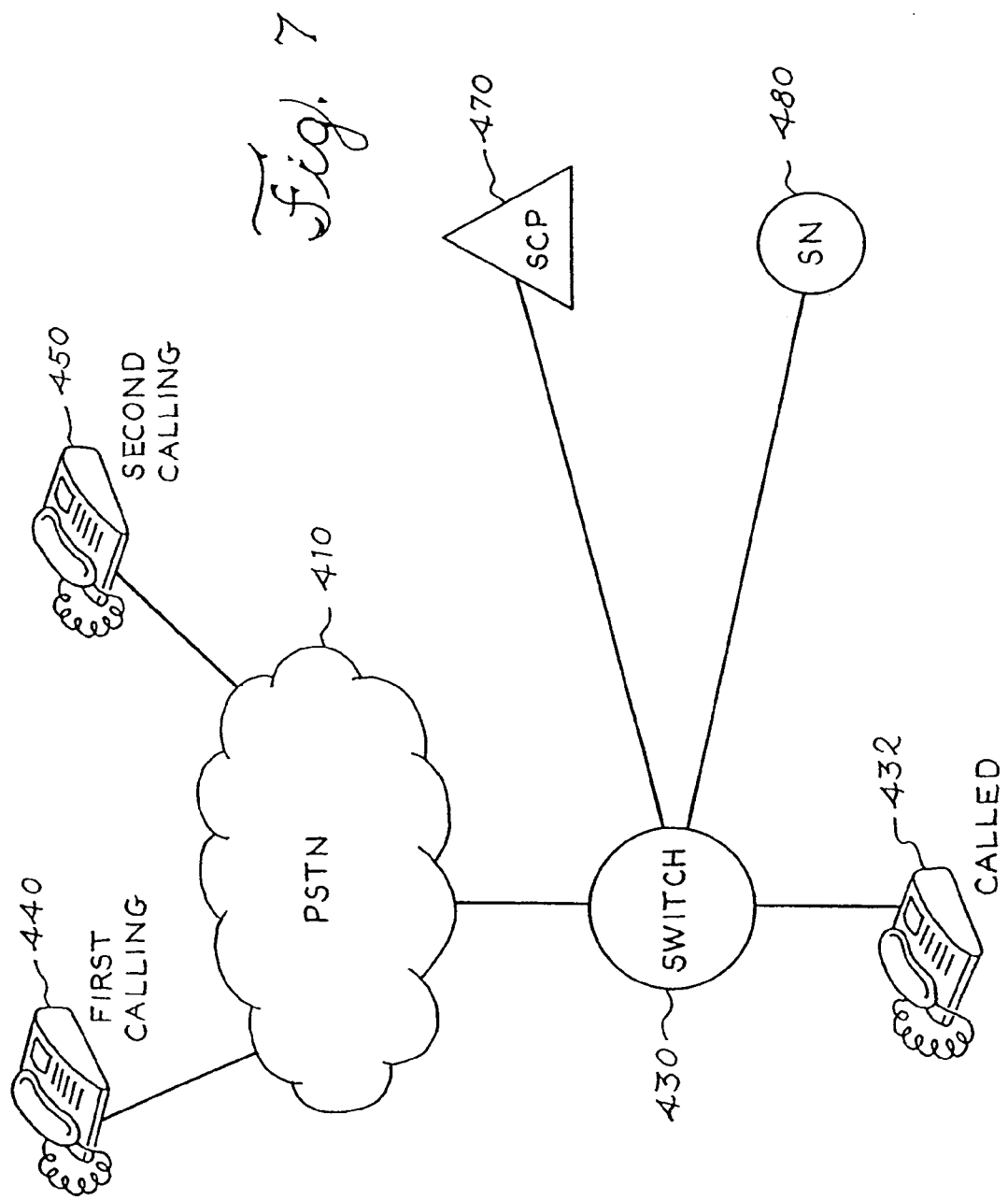
FIG. 7 is a more detailed block diagram of the system depicted in FIG. 1.

Referring now to FIG. 7, an alternative embodiment of the system of FIG. 2 is depicted. In this embodiment, the system comprises a publicly switched telephone network (PSTN) 410, a called party's switch 430, a called telephone station 432, a first calling telephone station 440, a second calling telephone station 450, a service control point (SCP) 470, and a service node (SN) 480, all as described above in reference to FIG. 2. In this embodiment, the called party's switch 430 is coupled with the SCP 470 and the SN 480. The called party's switch is preferably coupled with the SCP 470 and the SN 480 through a signaling protocol such as SS7 but can also be coupled through a primary rate interface (PRI) or other protocols such as internet protocols.

When a called party at the called telephone station 432 is engaged in a first telephone call with a first calling party at the first calling telephone station 440, and a second calling party at the second calling telephone station 450 places a second call to the called telephone station 432, the second call is routed through the PSTN 410 to the called party's switch 430. When the called party's switch 430 receives the second call, it can determine that the called telephone station is engaged in a first call and a query can be transmitted to the SCP 470. The SCP 470 receives and analyzes the query as described above to determine whether the call originated from the SN 480. If the call did not originate from the SN 480, the SN can transmit an announcement to the second calling telephone station 440 requesting information. The SN 480 can then record information transmitted from the second calling telephone station 440. The SN 480 can then transmit the recorded information to the called telephone station 432 when the first call is over, as described above.

In a further alternative embodiment, the call from the SN 280, 480 to the called telephone station 232, 432 (act 352, FIG. 6) can also be used to notify the called party that a traditional voice mail message was left for them by a second calling party while they were engaged in a first call. After the called party answers the call from the SN 280, 480, an announcement can be transmitted to the called party indicating that a number of messages were received while they were engaged in the first call. This allows the called party to be notified that a voice mail message has been left for them without requiring the called party to access the voice mail system as is normally required.

In a further alternative embodiment, after it is determined that the first call is over (acts 352-356, FIG. 6), the SN 280, 480 can place an outgoing call to the second calling telephone station 250, 450 to notify the second calling party that the first call is over and the called party is now available. This enables the second calling party to reach the called party without having to repeatedly place calls to the called party.

The present embodiments provide an efficient and effective method and system for providing information about other calls placed to a called party while they are busy on a first call. The present embodiments record information provided by a second calling party and provide the recorded information to the called party after the first call is over. Because the recorded information is automatically provided to the called party only after the first call is over, and because a traditional call waiting indicator is not used, the called party is not interrupted during the first call.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method for processing a second call from a calling party to a called communication station that is engaged in a first call, the method comprising:
   determining that the called communication station is engaged in the first call;
   automatically routing the second call to a telecommunication network element in response to determining the called communication station is engaged in the first call;
   recording information provided by the calling party;
   transmitting a request for a control command to a second calling station;
   receiving a control command from the second calling station, the control command assigning a priority to the recorded information; and
   automatically transmitting the recorded information and an announcement comprising options for processing the recorded information to the called communication station after the first call is completed, the automatically transmitting being performed in response to the priority assigned to the recorded information.

2. The method of claim 1, wherein the recorded information is automatically transmitted to the called communication station after determining during varying time periods that the first call is completed.

3. The method of claim 1, wherein recording information by a calling party comprises recording audible information provided by the calling party.

4. The method of claim 3, wherein the audible information comprises a name of the calling party and a telephone number.

5. The method of claim 1, wherein a switch determines that the called communication station is engaged in the first call.

6. The method of claim 1, wherein a service node records information provided by the calling party.

7. The method of claim 1, wherein an intelligent peripheral records information provided by the calling party.

8. The method of claim 1, wherein a hub switch routes the second call to a telecommunication network element.

9. A computer-readable storage medium comprising a set of instructions for processing a second call from a calling party to a called communication station that is engaged in a first call, the set of instructions to direct a computer system to perform acts of:
   determining that the called communication station is engaged in the first call;
   automatically routing the second call to a telecommunication network element in response to determining the called communication station is engaged in the first call;

recording information provided by the calling party;

transmitting a request for a control command to a second calling station;

receiving a control command from the second calling station, the control command assigning a priority to the recorded information; and automatically transmitting the recorded information and an announcement comprising options for processing the recorded information to the called communication station after the first call is completed, the automatically transmitting being performed in response to the priority assigned to the recorded information.

10. The computer-readable storage medium of claim 9, wherein the recorded information is automatically transmitted to the called communication station after determining during varying time periods that the first call is completed.

11. The computer-readable storage medium of claim 9, wherein recording information by a calling party comprises recording audible information provided by the calling party.

12. The computer-readable storage medium of claim 11, wherein the audible information comprises a name of the calling party and a telephone number.

13. A system for processing a second call from a calling party to a called communication station that is engaged in a first call, the system comprising:

means for determining that the called communication station is engaged in the first call;

means for recording information provided by the calling party;

means for transmitting a request for a control command to a second calling station;

means for receiving a control command from the second calling station, the control command assigning a priority to the recorded information; and means for automatically transmitting the recorded information and an announcement comprising options for processing the recorded information to the called communication station after determining during varying time periods the first call is completed, the automatically transmitting being performed in response to the priority assigned to the recorded information.

14. The system of claim 13, wherein the means for determining that the called communication station is engaged in the first call comprises a switch.

15. The system of claim 13, wherein the means for recording information provided by the calling party comprises a service node.

16. The system of claim 13, wherein the means for recording information provided by the calling party comprises an intelligent peripheral.

17. The system of claim 13, wherein the means for automatically transmitting the information to the called communication station comprises a hub switch.

18. The system of claim 13, further comprising: means for transmitting an announcement to the calling party requesting information from the calling party.

19. The method of claim 1, further comprising: monitoring the status of the first call to determine when the first call is completed.

20. The method of claim 1, wherein automatically transmitting the recorded information and an announcement comprising options for processing the recorded information to the called communication station after the first call is completed comprises:

placing a third call to the called communication station.

21. The computer-readable storage medium of claim 9, further comprising a set of instructions to direct the computer system to perform the act of:

monitoring the status of the first call to determine when the first call is completed.

22. The computer-readable storage medium of claim 9, wherein automatically transmitting the recorded information and an announcement comprising options for processing the recorded information to the called communication station after the first call is completed comprises:

placing a third call to the called communication station.

23. The system of claim 13, further comprising:

means for monitoring the status of the first call to determine when the first call is completed.

24. The system of claim 13, wherein the means for automatically transmitting the recorded information and an announcement comprising options for processing the recorded information to the called communication station after determining during varying time periods the first call is completed is operative to place a third call to the called communication station.

* * * * *